(12) United States Patent
Jain et al.

(10) Patent No.: US 12,164,322 B2
(45) Date of Patent: Dec. 10, 2024

(54) DEVICE, METHOD AND SYSTEM TO DETERMINE A MODE OF VOLTAGE REGULATION BASED ON PARASITICS OF A POWER DELIVERY NETWORK

(71) Applicant: Intel Corporation, Santa Clara, CA (US)

(72) Inventors: Amit K. Jain, Sherwood, OR (US); Mauricio Aguilar Salas, Heredia (CR); Jonathan Douglas, Cave Creek, AZ (US); Anant Deval, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 17/359,413

(22) Filed: Jun. 25, 2021

(65) Prior Publication Data

US 2022/0413536 A1 Dec. 29, 2022

(51) Int. Cl.
*G05F 1/59* (2006.01)
*G05F 1/575* (2006.01)
*G06F 1/3203* (2019.01)

(52) U.S. Cl.
CPC ............... *G05F 1/59* (2013.01); *G05F 1/575* (2013.01); *G06F 1/3203* (2013.01)

(58) Field of Classification Search
None
See application file for complete search history.

(56) References Cited

U.S. PATENT DOCUMENTS

| | | | | |
|---|---|---|---|---|
| 7,242,169 B2* | 7/2007 | Kanamori | ........... | H02M 3/1588 323/284 |
| 8,711,582 B2* | 4/2014 | Stuler | ..................... | H02M 1/34 363/21.06 |
| 9,621,059 B2* | 4/2017 | Halberstadt | ....... | H02M 3/33592 |
| 10,014,782 B2* | 7/2018 | Dai | ..................... | H02M 3/3376 |
| 10,277,105 B1* | 4/2019 | Vinciarelli | ............ | H01L 23/645 |
| 10,498,218 B2* | 12/2019 | Nishimoto | .......... | H02M 3/1582 |
| 11,271,468 B2* | 3/2022 | Phadke | ............. | H02M 3/33592 |
| 11,532,989 B2* | 12/2022 | Waghmare | .......... | H01F 27/2804 |
| 11,658,673 B2* | 5/2023 | Morgan | ................ | H02J 7/0063 341/144 |
| 11,923,774 B2* | 3/2024 | Hosotani | ............. | H02M 1/0009 |
| 2018/0083545 A1* | 3/2018 | Vijayan | ............... | H02M 7/4826 |
| 2022/0413536 A1* | 12/2022 | Jain | .......................... | G06F 1/26 |

* cited by examiner

*Primary Examiner* — Thomas J. Hiltunen
(74) *Attorney, Agent, or Firm* — NICHOLSON DE VOS WEBSTER & ELLIOTT LLP

(57) ABSTRACT

Techniques and mechanisms for determining an operational mode of a voltage regulator. In an embodiment, an integrated circuit (IC) die is coupled to receive power from a voltage regulator (VR) via a power delivery network (PDN) which comprises circuitry in or on a substrate, such as that of a printed circuit board. The IC die receives from the substrate information indicating a characteristic of a parasitic impedance at the substrate. Based on the information, a controller unit at the IC die selects one of multiple VR modes which each correspond to a respective one of different parasitic impedance characteristics. The controller then signals the VR to provide the selected mode. In an embodiment one of the VR modes corresponds to a relatively high impedance, and also corresponds to a relatively stable sensitivity function in a frequency range above a control bandwidth.

20 Claims, 9 Drawing Sheets

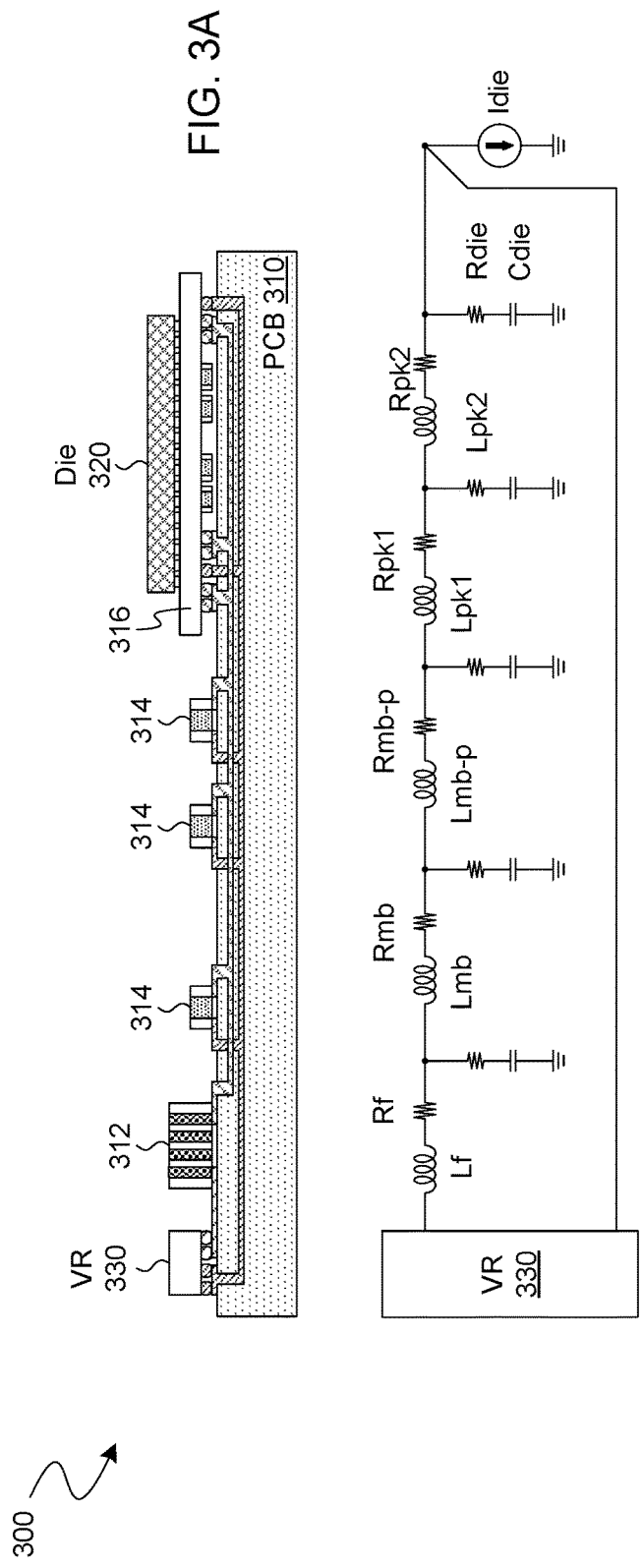
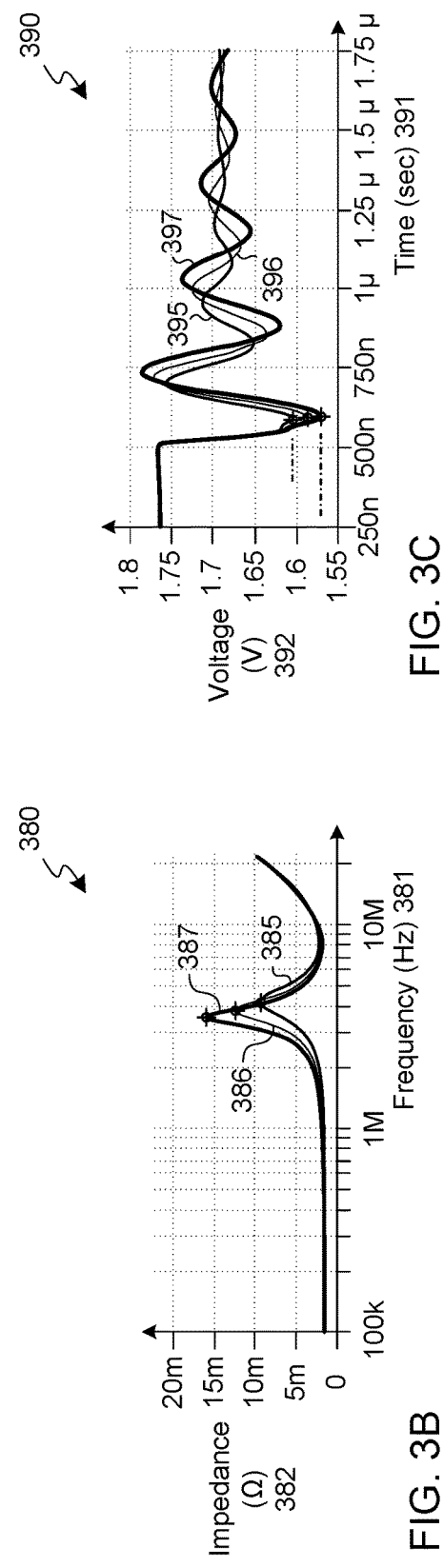
FIG. 3A
FIG. 3B
FIG. 3C $$\omega z1 = \frac{1}{(R2)(C1)}$$

$$\omega z2 = \frac{1}{(C3)(R1 + R3)}$$

$$\omega p1 = \frac{(C1 + C2)}{(R2)(C1)(C2)}$$

$$\omega p2 = \frac{1}{(R3)(C3)}$$

$$Kc = \frac{1}{(R1)(C1 + C2)}$$

R1 = Choose $$C2 = \frac{\omega z1}{(Kc)(\omega p1)(R1)}$$

$$C1 = C1 = C2\,[\,(\omega p1 / \omega z1) - 1\,]$$

$$R2 = \frac{1}{(\omega z1)(C1)}$$

$$R3 = \frac{R1}{[\,(\omega p2 / \omega z2) - 1\,]}$$

$$C3 = \frac{1}{(\omega p2)(R3)}$$

$$Gc = \frac{Kc\,[\,1 + (s/\omega z1)\,]\,[\,1 + (s/\omega z2)\,]}{s\,[\,1 + (s/\omega p1)\,]\,[\,1 + (s/\omega p2)\,]}$$

DEVICE, METHOD AND SYSTEM TO DETERMINE A MODE OF VOLTAGE REGULATION BASED ON PARASITICS OF A POWER DELIVERY NETWORK

BACKGROUND

1. Technical Field

This disclosure generally relates to voltage regulation and more particularly, but not exclusively, to improving operation of a voltage regulator based on parasitic impedance characteristics of a platform.

2. Background Art

A voltage regulator on a baseboard can provide power to a central processing unit (CPU). To drive today's powerful CPUs, more power and current are needed. However, with increased power delivery to the CPU, static and transient voltage droop have become more significant problems. Voltage droop refers to a drop in the voltage in response to a CPU load. A transient voltage droop may occur as an initial drop in voltage when power is supplied to a CPU or when a load changes. A static voltage droop indicates a drop in voltage that is constant over time.

BRIEF DESCRIPTION OF THE DRAWINGS

The various embodiments of the present invention are illustrated by way of example, and not by way of limitation, in the figures of the accompanying drawings and in which:

FIG. 3A show a cross-sectional side view of a system to deliver power with a voltage regulator according to a corresponding embodiment.

FIGS. 3B, 3C show graphs each illustrating circuit characteristics of a power delivery network which is operated with a voltage regulator according to a corresponding embodiment.

DETAILED DESCRIPTION

Figure 1A:
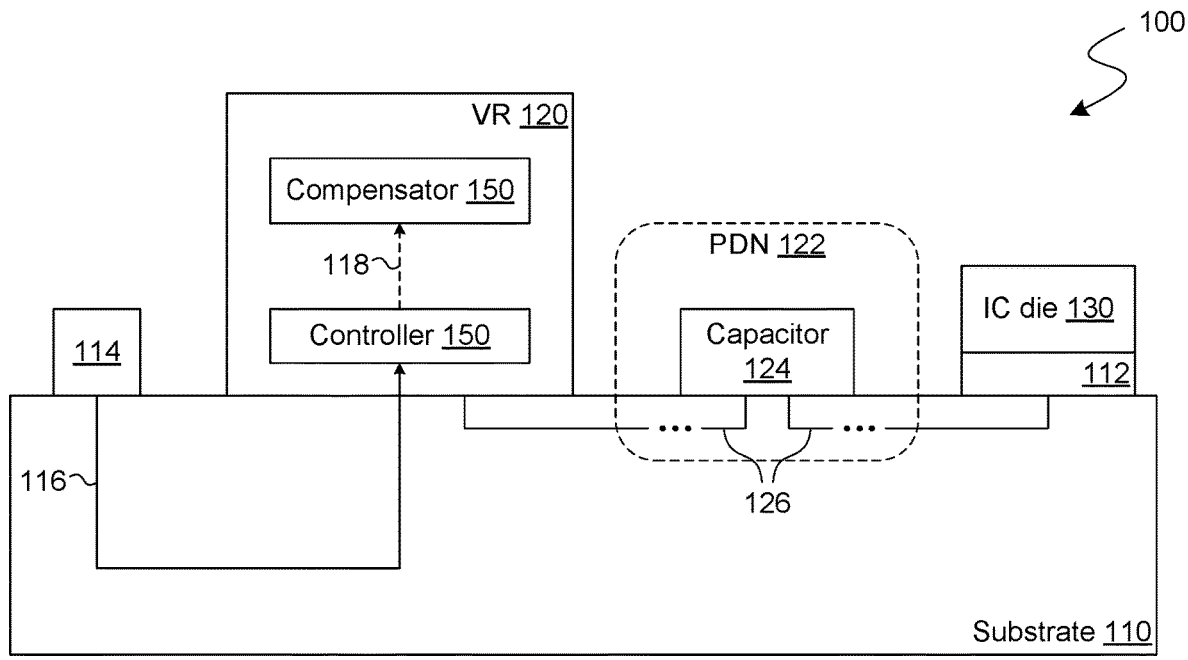
FIGS. 1A, 1B show functional block diagrams each illustrating respective features of a system to provide a mode of voltage regulation according to a corresponding embodiment.

Embodiments discussed herein variously provide techniques and mechanisms for determining an operational mode of a voltage regulator based on an information indicating parasitic impedance characteristics of a power delivery network. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a circuitry to control the operation of a voltage regulator which provides a voltage to a power delivery network.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

FIG. 1A shows features of a system 100 to provide a mode of voltage regulation according to an embodiment. System 100 illustrates one example of an embodiment wherein parasitic characteristics of a power delivery network, which comprises circuitry in or on a substrate (such as that of a printed circuit board), provide a basis for determining an operational mode of a voltage regulator.

As shown in FIG. 1A, system 100 comprises a substrate 110 having formed therein or thereon various interconnects, circuit components and/or other circuit structures of a power delivery network (PDN) 122. System 100 further comprises a VR 120 and an integrated circuit (IC) die 130 which are variously coupled to substrate 110—e.g., wherein VR 120 provides functionality to deliver power to IC die 130 via PDN 122. In the embodiment shown, IC die 130 is coupled to a top surface of substrate via a hardware interface 112 comprising (for example) a ball grid array, a package substrate and/or other suitable circuit devices.

In the example embodiment shown, PDN 122 comprises one or more decoupling capacitors (such as the capacitor 124 shown) and traces 126 in substrate 110 that variously couple VR 120 and IC die 130 to each other. However, PDN 122 additionally or alternatively comprises any of various other combinations of circuit structures, which are not limiting on some embodiments. In typical use cases, some or all such circuit structures of PDN 122 are susceptible to parasitic impedances that, for example, change over a range of frequencies for circuit switching by VR 120. Such parasitic impedances (for brevity, referred to herein as "parasitics") pose problems related, for example, to recovering from instances of voltage droop.

Some embodiments mitigate such problems by determining a mode of operation by VR 120—e.g., wherein the mode is selected, from among a plurality of available VR modes, based on information which indicates to controller logic 150 of VR 120 a parasitic impedance of PDN 122. In various embodiments, controller 150 is provided with hardware, firmware, and/or executing software of VR 120 (or of another circuit resource which is coupled to VR 120).

Figure 1B:
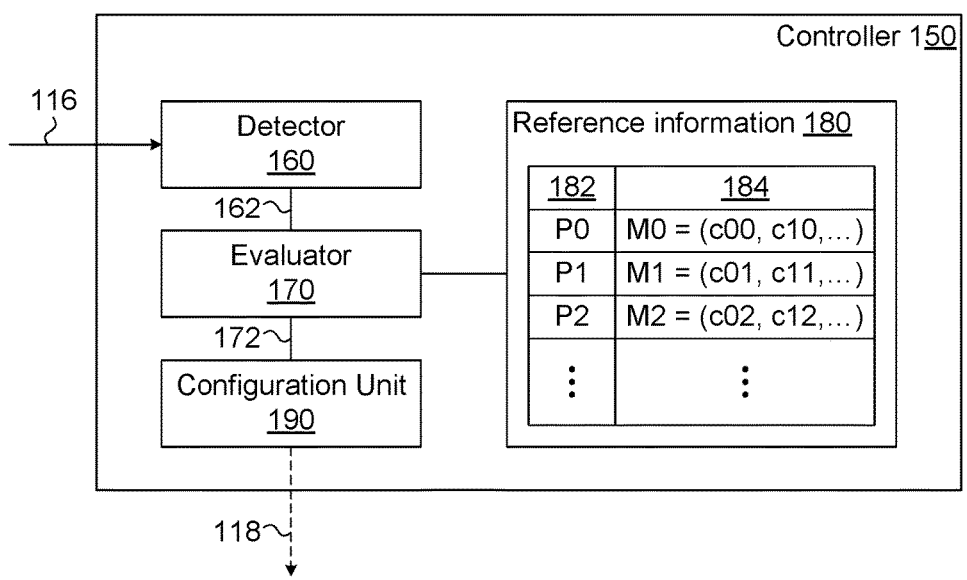

For example, FIG. 1B illustrates functionality provided with controller 150 according to an embodiment. In the example embodiment shown, a detector 160 of controller 150 is coupled to receive a signal 116 which specifies or otherwise indicates a parasitic impedance characteristic of substrate 110. In this context, a parasitic impedance characteristic of substrate 110 is understood to include a parasitic impedance of the PDN 122 which is in or on substrate 110.

In one illustrative embodiment, signal 116 is provided to controller 150 from type identifier circuitry 114 which is disposed in or on substrate 110. Type identifier circuitry 114 comprises (for example) one or more fuses, hardwired signal lines, a microcontroller, programmable gate array, or other such circuitry suitable to generate or otherwise provide signaling which includes impedance characteristic information. In one such embodiment, signal 116 is provided to controller 150 via a hardware interface by which controller 150 is coupled to substrate 110.

In the example embodiment shown, detector 160 identifies the parasitic impedance characteristic (e.g., including one or more impedance values) indicated by signal 116. Based on the identified characteristic, detector 160 sends to an evaluator 170 of controller 150 a signal 162 which identifies an index with which evaluator 170 is to access information such as the illustrative reference information 180 shown. Reference information 180 represents any of various suitable resources—e.g., including a table, a linked list, a register bank, or the like—to identify, for each of multiple parasitic impedance characteristic, a correspondence of said parasitic impedance characteristic with a particular mode of multiple possible operational modes of VR 120.

As shown in FIG. 1B, reference information 180 comprise a table having columns 182, 184, wherein—for a given entry in the table—the impedance characteristic in column 182 is identified as corresponding to the associated operational mode in column 184. Based on signal 162 and the accessing of reference information 180, evaluator 170 identifies a given VR mode (and the one or more compensator settings which comprise said VR mode) as being best suited to accommodate the impedance characteristics indicated by signal 116.

The one or more compensator settings of the selected VR mode are then identified in a signal 172 to a configuration unit 190 of controller 150. Based on signal 172, configuration unit 190 communicates a control signal 118 which is sent—e.g., via substrate 110—to configure VR 120. As described herein, control signal 118 indicates respective settings to one or more variable circuit components of a compensator unit of VR 120, in some embodiments.

Figure 2:
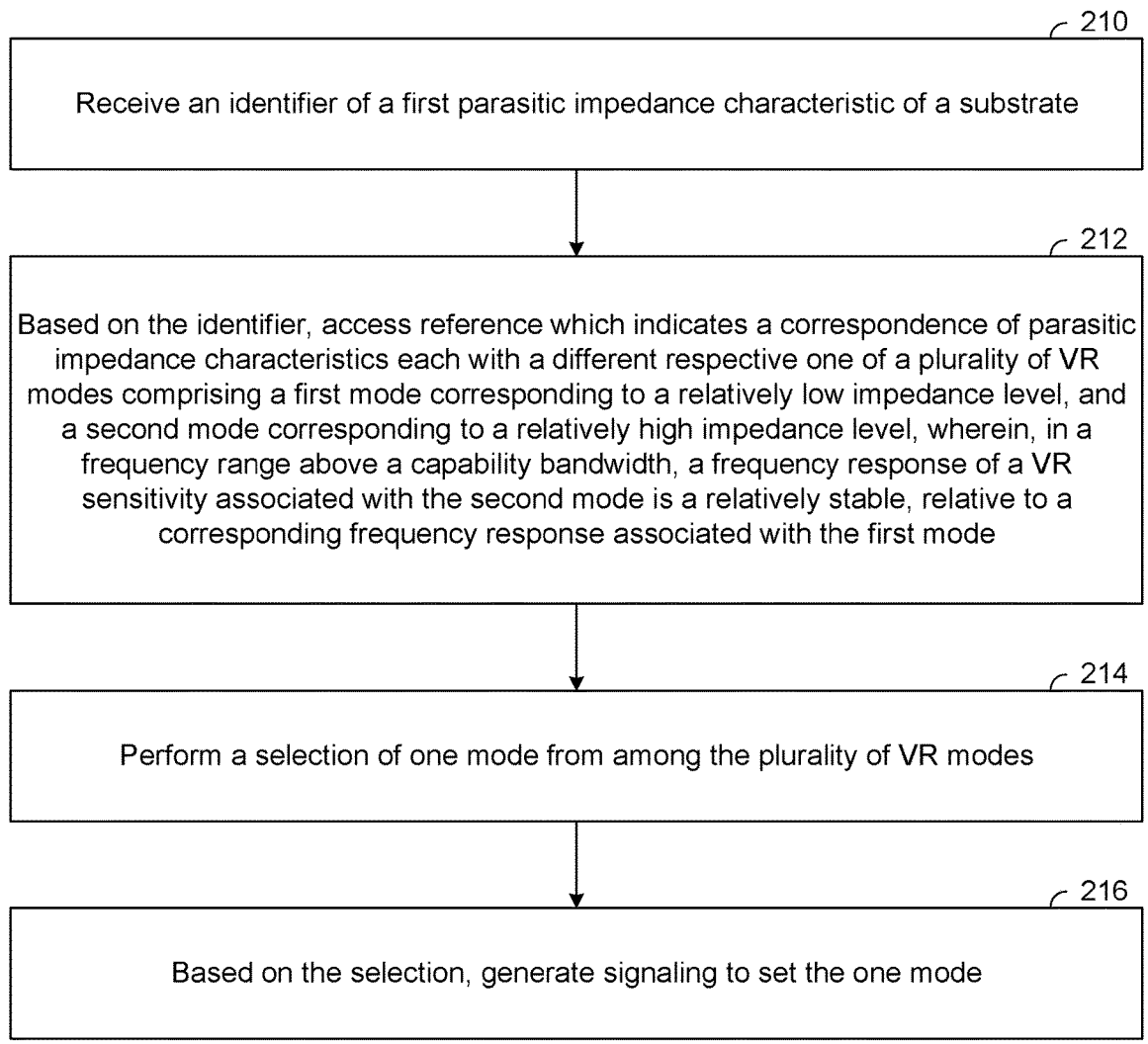
FIG. 2 shows a flow diagram illustrating features of a method to control operation of a voltage regulator according to an embodiment.

FIG. 2 shows features of a method 200 to control operation of a voltage regulator according to an embodiment. The method 200 illustrates one example of an embodiment wherein parasitics of a power delivery network are evaluated to determine a VR mode which—of multiple available VR modes—best accommodates said parasitics. Operations such as those of method 200 are performed, for example, with controller 150.

As shown in FIG. 2, method 200 comprises (at 210) receiving at a VR controller an identifier of a first parasitic impedance characteristic of a substrate. For example, the substrate is a motherboard—or other suitable printed circuit board—which has coupled thereto a voltage regulator. Furthermore, said motherboard has variously formed therein or thereon components of a PDN which is to provide power from the VR to an IC die.

In an example embodiment, the identifier received at 210 specifies or otherwise indicates a parasitic inductance value, a parasitic capacitance value, and/or a parasitic resistance value associated with the PDN structures which are in or on the substrate. Such values are provided, for example, by a manufacturer, wholesaler, retailer or other agent—e.g., with circuitry in or on the substrate. By way of illustration and not limitation, one or more fuses on the substrate are configured to represent one or more impedance values. Additionally or alternatively, one or more signal lines of the substrate are hardwired each to communicate a respective one of a high voltage or a low voltage to indicate one or more parasitic impedance values. Additionally or alternatively, a microcontroller, state machine, programmable gate array (PGA) or other suitable circuitry on the substrate is programmed to participate in communications including the transmission of parasitic impedance information to VR controller logic.

In various embodiments, communication of parasitic impedance information at 210 comprises one or more communications which—for example—are compatible with a Power Management Bus (PMBus) protocol, a Serial Voltage Identification Debug (SVID) bus protocol, a I2C serial communication protocol, a Joint Test Action Group (JTAG) standard such as the IEEE 1149.7 standard of released in 2009 by the Institute of Electrical and Electronics Engineers, or the like.

Based on the identifier received at 210, method 200 (at 212) accesses reference which specifies or otherwise indicates a correspondence of parasitic impedance characteristics each with a different respective one of a plurality of VR modes. For example, the accessing at 212 comprises performing a table lookup or other suitable operation to identify a VR mode which most closely corresponds to the indicated parasitic impedance characteristic.

The plurality of modes comprises at least a first mode and a second mode, wherein the first mode corresponds to a parasitic impedance level which is low, relative to another parasitic impedance level which corresponds to the second mode. In one such embodiment, a VR sensitivity which is associated with the second mode is relatively stable, at least in a frequency range which is above a capability bandwidth, compared to a corresponding frequency response associated with the first mode. Additionally or alternatively, along that frequency range, a local peak of a different impedance associated with the second mode is relatively low, compared to a corresponding local peak impedance associated with the first mode.

For example, a first delivery of power with the substrate and the VR (the first delivery based on the first mode) corresponds to both a first control bandwidth frequency, and a first frequency response of a sensitivity of the VR. By contrast, a second delivery power with the substrate and the VR (the second delivery based on the second mode) corresponds to both a second control bandwidth frequency, and a second frequency response of the sensitivity. In one such embodiment, in a range of frequencies above the second control bandwidth frequency, a first local peak of the first frequency response is greater than a second local peak of the second frequency response.

Additionally or alternatively, the first power delivery (based on the first mode) corresponds to a third frequency response of an impedance from the IC die to the VR—e.g., wherein the second power delivery (based on the second mode) further corresponds to a fourth frequency response of the impedance. In one such embodiment, in the range of frequencies above the second control bandwidth frequency, a local peak of the third frequency response is smaller than another local peak of the fourth frequency response.

Method 200 further comprises (at 214) performing a selection of one mode from among the plurality of VR modes, and (at 216) generating a signal to set the VR mode which was selected at 214. In some embodiments, the VR comprises an analog compensator circuit, wherein signaling the VR at 216 to set the mode comprises sending a communication which identifies to the VR a respective setting for each of one or more variable circuit elements of the compensator circuit. In other embodiments, the VR is implemented digitally with microcode or other suitable digital logic that implements a compensator unit. In one such embodiment, signaling the VR at 216 comprises sending a communication which identifies one or more values each for to a respective coefficient of a digital filter of the compensator unit.

FIG. 3A shows features of a system 300 to deliver power with a voltage regulator according to an embodiment. The system 300 illustrates one example of an embodiment wherein a power delivery network exhibits parasitics, which are evaluated by a controller to determine an operational mode of a VR. In various embodiments, system 300 provides functionality such as that of system 100—e.g., wherein power delivery with system 300 includes or is otherwise based on operations of method 200.

FIG. 3A shows a cross section and schematic for an example of high frequency voltage regulator (HFVR) power delivery according to an embodiment. In the example embodiment shown, system 300 comprises a PCB 310 with a VR 330 and an IC die 320 variously coupled thereto. VR 330 is coupled to provide power to die 320 via a PDN which, in the example embodiment shown, includes a filter circuit 312, various decoupling capacitors 314, and traces, vias and/or other interconnect structures which variously extend in PCB 310 to (and through) the illustrative package substrate 316 shown.

In one such embodiment, parasitic impedance characteristics of the PDN include, or are otherwise based, on parasitic impedances Lf, Rf at filter circuit 312, parasitic impedances Lmb, Rmb in the PCB 310 itself, and impedances Lmb-p, Rmb-p due to an offset between capacitors 314 and the hardware interface coupling package substrate 316 to PCB 310. Additionally or alternatively, such parasitic impedance characteristics are based on parasitic impedances Lpk1, Rpk1, Lpk2, Rpk2 at the hardware interface itself.

Often, PCB designs which are otherwise similar are subject to exhibiting significantly different parasitic impedances—e.g., due to variations in the distance between die 320 and capacitors 314, the number of metallization layers in PCB 310, board technology (e.g. Type 3 vs Type 4), etc. Such variation significantly affects operational power and performance characteristics of a platform.

For example, FIG. 3B shows a graph 380 which includes plots 385, 386, 387 each for respective levels of an impedance 382 over a range of frequencies 381. More particularly, plots 385, 386, 387 represent the impedance curves for a low-impedance PCB, a medium-impedance PCB, and a high-impedance PCB (respectively). In a frequency range over a control bandwidth—e.g, in a range from 1 MHz to 10 MHz—the various PCBs each exhibit a respective spike in impedance 382. The magnitude of this spike varies significantly between the PCBs, due in part to the respective parasitic impedances thereof.

In turn, the differences between plots 385, 386, 387 correspond (for example) to differences in susceptibility to voltage droop. For example, FIG. 3C shows a graph 390 which includes plots 395, 396, 397 each for respective levels of an output voltage 392 over a range of frequencies 391. More particularly, plots 395, 396, 397 represent voltage curves for a low-impedance PCB, a medium-impedance PCB, and a high-impedance PCB (respectively). As shown in graph 390 variation in parasitic impedance contributes significantly to the difference between a 160 mV droop (for a low impedance PCB) and a 190 mV droop (for to a high impedance PCB). To facilitate improved voltage droop response and/or other operational performance characteristics, some embodiments variously indicate a parasitic impedance of a PCB to a VR controller, which evaluates the indicated parasitic impedance to select a mode from a plurality of available VR modes.

Figure 4:
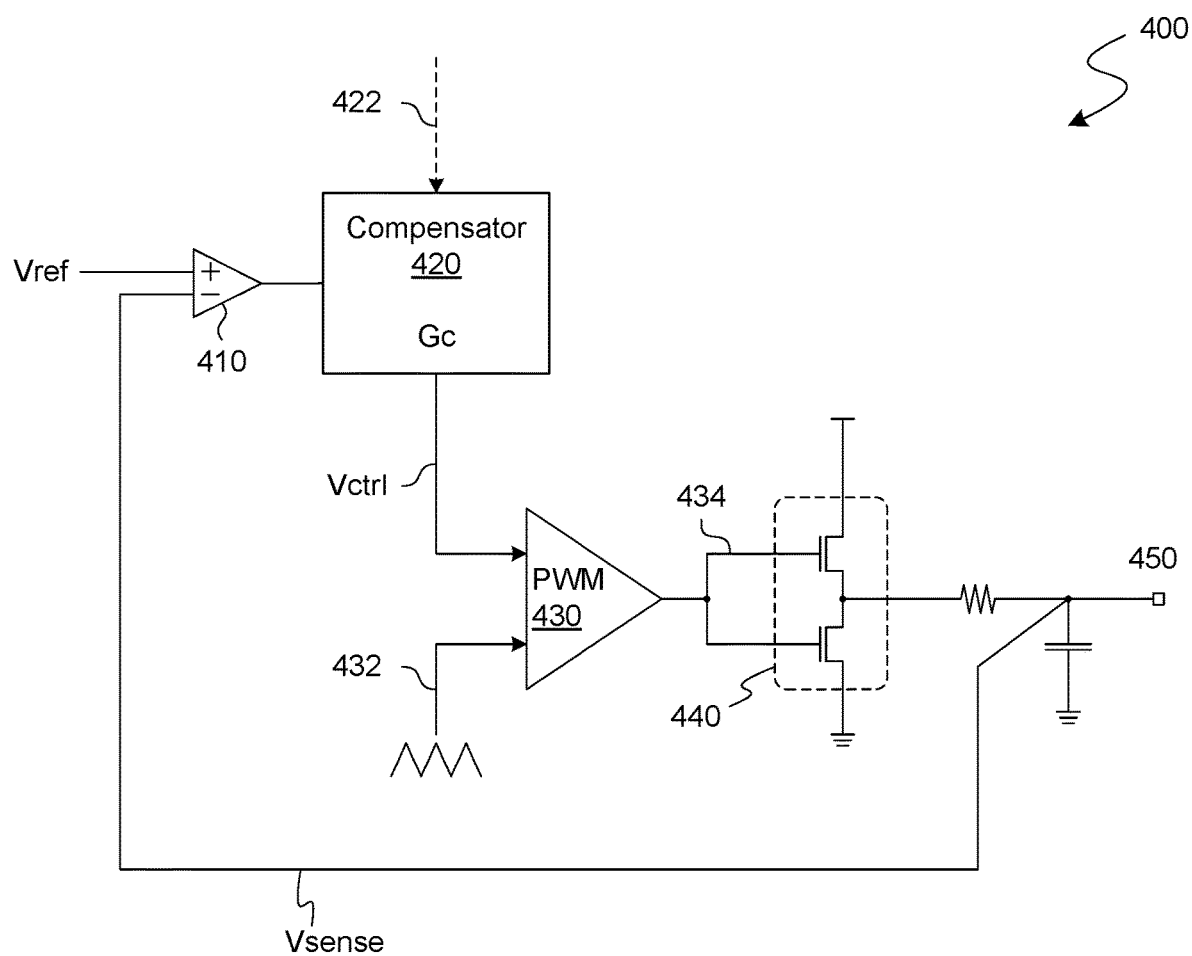
FIG. 4 shows a hybrid circuit and functional block diagram illustrating features of a voltage regulator to operate according to a mode which is determined based on parasitic impedance information according to an embodiment.

FIG. 4 shows features of a voltage regulator 400 to implement an operational mode which is determined based on parasitic impedance information according to an embodiment. Voltage regulator 400 illustrates one example of an embodiment communicates a VR mode to be configured based on an evaluation of parasitic characteristics of a power delivery network. In various embodiments, voltage regulator 400 provides functionality such as that of VR 120 or VR 330—e.g., wherein a mode of voltage regulator 400 is determined according to method 200.

As shown in FIG. 4, voltage regulator 400 comprises a differential amplifier 410 which is coupled to receive a reference voltage Vref and a sense voltage Vsense. Differential amplifier 410 provides to a compensator 420 of voltage regulator 400 a signal representing a difference between the voltages Vref, Vsense. Compensator 420 applies to the received input signal a gain Gc, generating a resulting control voltage Vctrl which is then provided to a pulse width modulator PWM 430. In various embodiments, compensator 420 provides one or more feedback paths across differential amplifier 410.

In addition to receiving control voltage Vctrl from compensator 420, PWM 430 is further coupled to receive a triangular wave signal 432 (or other such signal which provides a configurable duty cycle) with which PWM 430 generates a modulated regulation signal 434. The regulation signal 434 is then provided (in this example illustrative embodiment) to FET circuitry 440 such as that of a buck converter of any of various other converters adapted, for example, from conventional VR designs. Regulation signal 434 determines a delivery of power through FET circuitry 440 to an output node 450 by which voltage regulator 400 is to be coupled to a power delivery network. In one such embodiment, the voltage at output node 450 is fed back to differential amplifier 410 as the sense voltage Vsense.

In various embodiments, the application of gain Gc by compensator 420 is subject to a frequency response profile of compensator 420, where the frequency response profile—in turn—is based on a current operational mode of voltage regulator 400. In an embodiment, such an operational mode of voltage regulator 400 comprises one or more settings each for a respective circuit component (e.g., including one or more variable resistors and/or one or more variable capacitors) of compensator 420. Such one or more setting are determined, for example, by a control signal 422 from a hardware logic and/or software logic which provides functionality such as that of controller 150.

Figure 5:
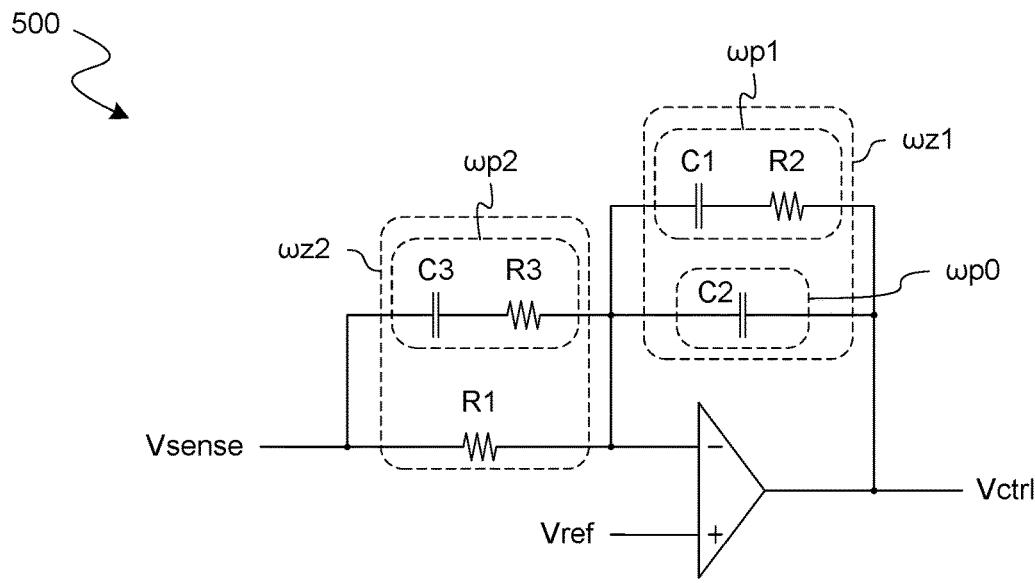
FIG. 5 shows a circuit diagram illustrating features of a compensator circuit to operate according to a mode which is determined based on parasitic impedance information according to an embodiment.

FIG. 5 shows features of a compensator 500 to receive a configuration based on parasitic impedance information according to an embodiment. In various embodiments, compensator 500 is a component of one of VRs 120, 330, 400—e.g., wherein configuration of compensator 500 includes or is otherwise based on operations of method 200.

As shown in FIG. 5, compensator 500 comprises (or alternatively, is coupled to) a differential amplifier—e.g. differential amplifier 410—which is coupled to generate an output signal Vctrl which represents an amplified version of a difference between a reference voltage Vref and a feedback voltage Vsense along with compensation Gc. In the example embodiment shown, circuit components of compensator 500 include feedback resistors R1, R2, and capacitors C1, C2, C3, some or all of which are variable to facilitate the selective configuration of various modes of a VR which includes compensator 500.

As shown by the example equations illustrated in FIG. 5, different feedback paths in compensator 500—each through a respective one or more variable circuit components—enable the configuring of gain Kc, various pole frequencies wp0, wp1, wp2 and/or various zero frequencies $\omega z1$, $\omega z2$. Selectively configuring such pole and zero frequencies determines at least in part a frequency response profile of the VR which includes compensator 500.

FIGS. 6A through 6D shows respective graphs 600, 610, 620, 630 variously illustrating frequency response characteristics of a voltage regulator which is operated with control logic according to an embodiment. The frequency response characteristics shown in graphs 600, 610, 620, 630 illustrate one example of a mode of VR operation which (for example) is to accommodate relatively low parasitic impedance of a power delivery network. In one such embodiment, the mode of VR operation is provided with configuration settings of compensator 420 (or compensator 500, for example)—e.g., wherein the mode is determined by control logic according to method 200.

Figure 6A:
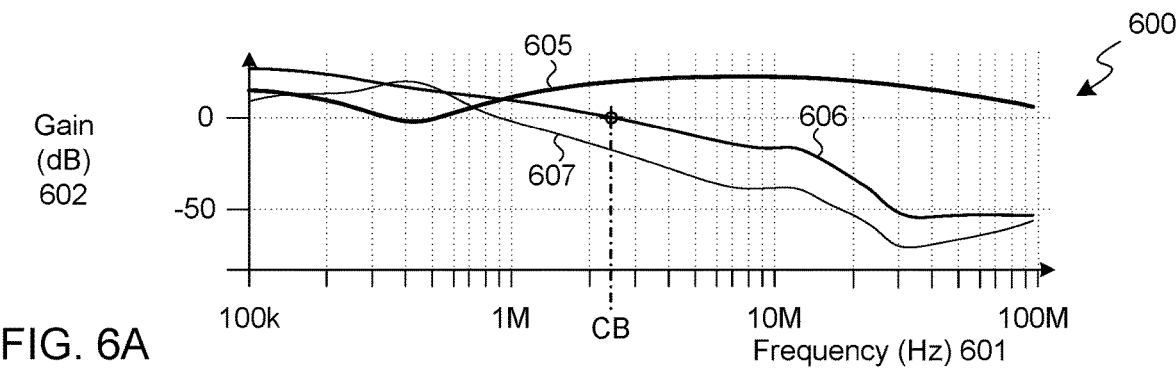
FIGS. 6A through 6D show graphs diagrams each illustrating characteristics of a voltage regulator mode for operation with a low impedance circuit board according to a corresponding embodiment.

Graphs 600, 610, 620, 630 variously illustrate frequency response characteristics of a VR which is delivering power via a power delivery network that has been classified as exhibiting low-level parasitics, where the operational mode of the VR is based on said classification. FIG. 6A shows a graph 600 which includes plots 605, 606, 607 each for respective magnitudes of a gain 602 over a range of frequencies 601. More particularly, plots 605, 606, 607 represent the VR's compensator gain (Gc), loop gain (GcGp), and power stage gain (Gp), respectively.

Figure 6B:
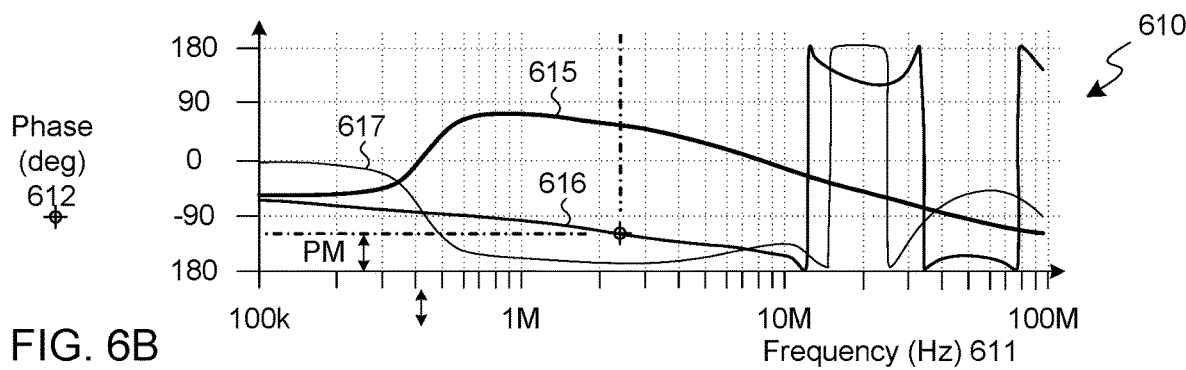
Figure 6C:
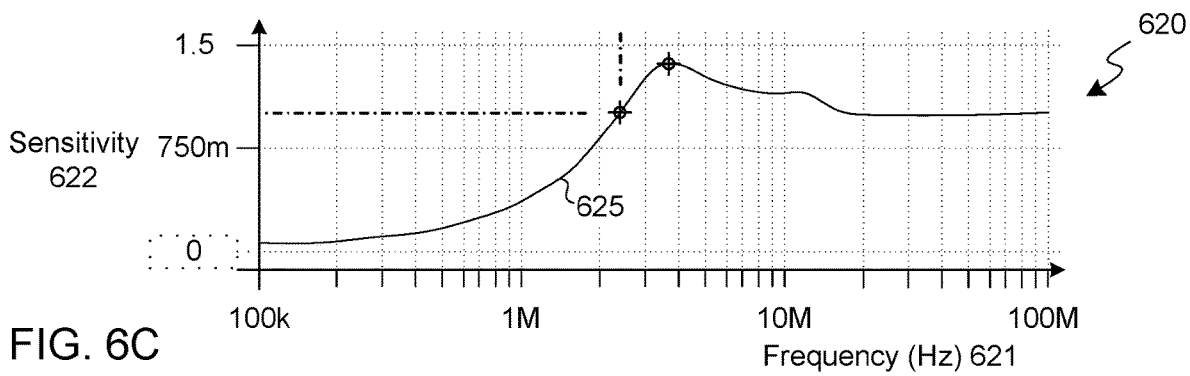
Figure 6D:
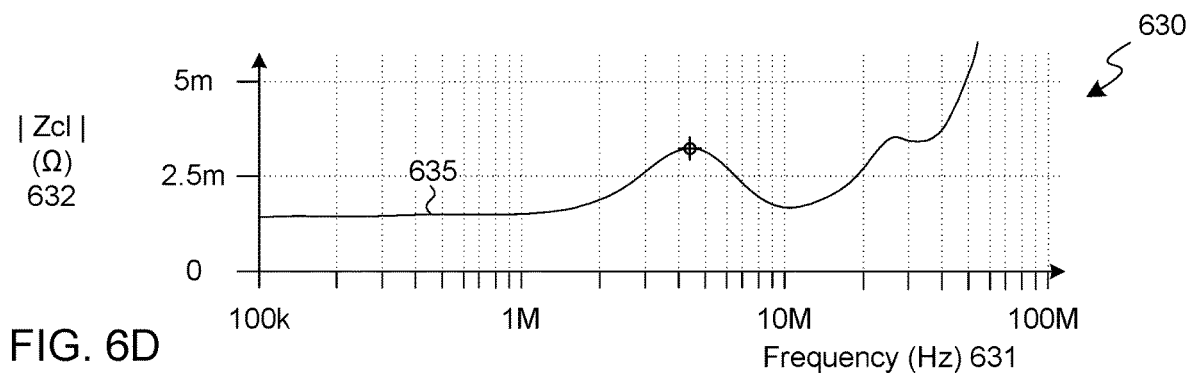

FIG. 6B shows a graph 610 which includes plots 615, 616, 617 each for respective amounts of a phase 612 over a range of frequencies 611. More particularly, plots 615, 616, 617 represent the respective phase response characteristics corresponding to the compensator gain (Gc), loop gain (GcGp), and power stage gain (Gp). FIG. 6C shows a graph 620 which includes a plot 625 for levels of a sensitivity 622 of the VR over a range of frequencies 621. FIG. 6D shows a graph 630 which includes a plot 635 for levels of an impedance |Zc1| 632 over a range of frequencies 631—e.g., where |Zc1| is an impedance as detected from a processor (or circuit receiving power via the PDN) toward the VR.

By contrast, FIGS. 7A through 7D shows respective graphs 700, 710, 720, 730 variously illustrating frequency response characteristics of a voltage regulator which is operated with control logic according to an embodiment. The frequency response characteristics shown in graphs 700, 710, 720, 730 illustrate one example of a mode of VR operation which (for example) is to accommodate relatively intermediate parasitic impedance of a power delivery network. In one such embodiment, the mode of VR operation is provided with configuration settings of compensator 420 (or compensator 500, for example)—e.g., wherein the mode is determined by control logic according to method 200.

Figure 7A:
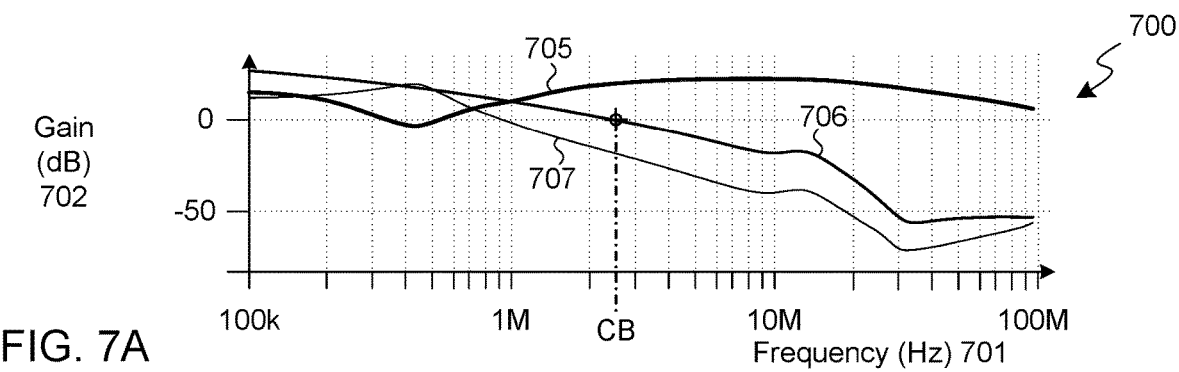
FIGS. 7A through 7D show graphs diagrams each illustrating characteristics of a voltage regulator mode for operation with a medium impedance circuit board according to a corresponding embodiment.

Graphs 700, 710, 720, 730 variously illustrate frequency response characteristics of a VR which is delivering power via a power delivery network that has been classified as exhibiting intermediate-level parasitics, where the operational mode of the VR is based on said classification. FIG. 7A shows a graph 700 which includes plots 705, 706, 707 each for respective magnitudes of a gain 702 over a range of frequencies 701. More particularly, plots 705, 706, 707 represent the VR's compensator gain (Gc), loop gain (GcGp), and power stage gain (Gp), respectively.

Figure 7B:
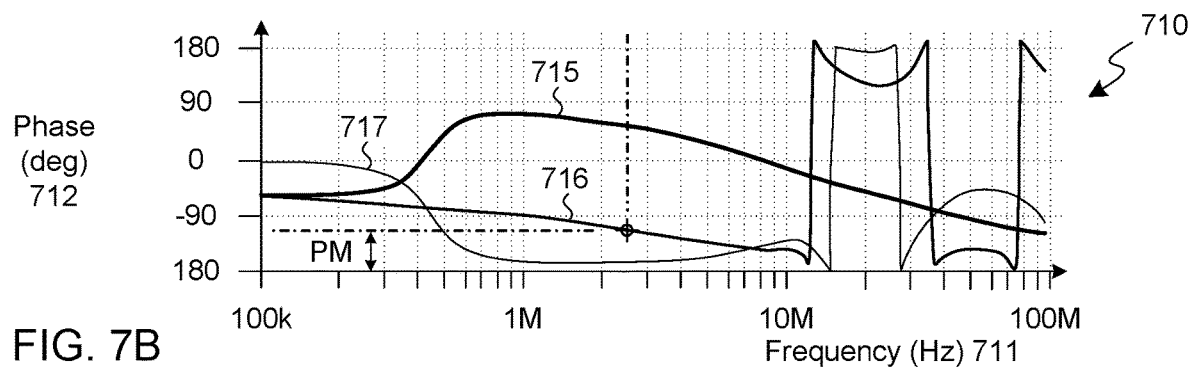
Figure 7C:
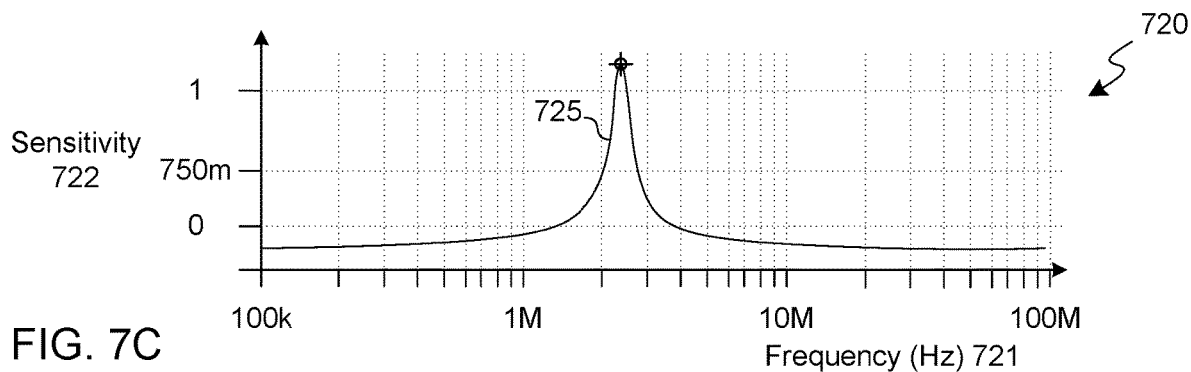
Figure 7D:
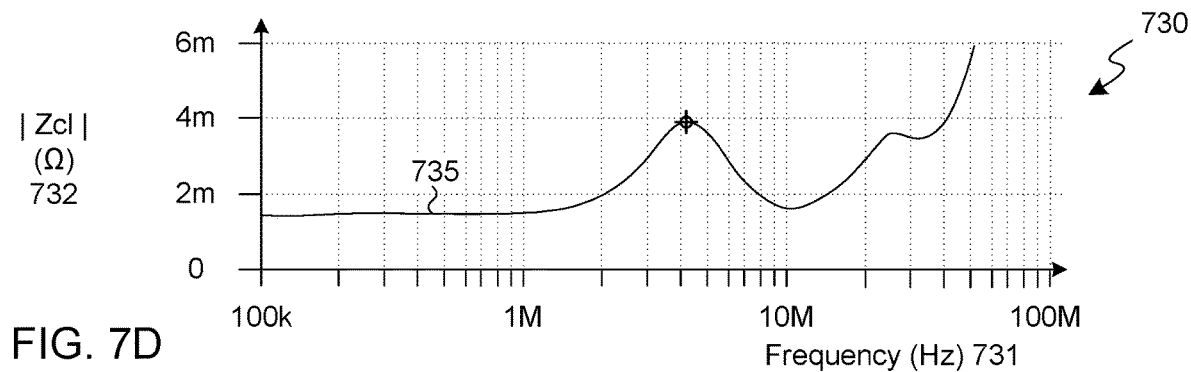

FIG. 7B shows a graph 710 which includes plots 715, 716, 717 each for respective amounts of a phase 712 over a range of frequencies 711. More particularly, plots 715, 716, 717 represent the respective phase response characteristics corresponding to the compensator gain (Gc), loop gain (GcGp), and power stage gain (Gp). FIG. 7C shows a graph 720 which includes a plot 725 for levels of a sensitivity 722 of the VR over a range of frequencies 721. FIG. 7D shows a graph 730 which includes a plot 735 for levels of the impedance |Zc1| 732 over a range of frequencies 731.

By contrast, FIGS. 8A through 8D shows respective graphs 800, 810, 820, 830 variously illustrating frequency response characteristics of a voltage regulator which is operated with control logic according to an embodiment. The frequency response characteristics shown in graphs 800, 810, 820, 830 illustrate one example of a mode of VR operation which (for example) is to accommodate relatively high parasitic impedance of a power delivery network. In one such embodiment, the mode of VR operation is provided with configuration settings of compensator 420 (or compensator 500, for example)—e.g., wherein the mode is determined by control logic according to method 200.

Figure 8A:
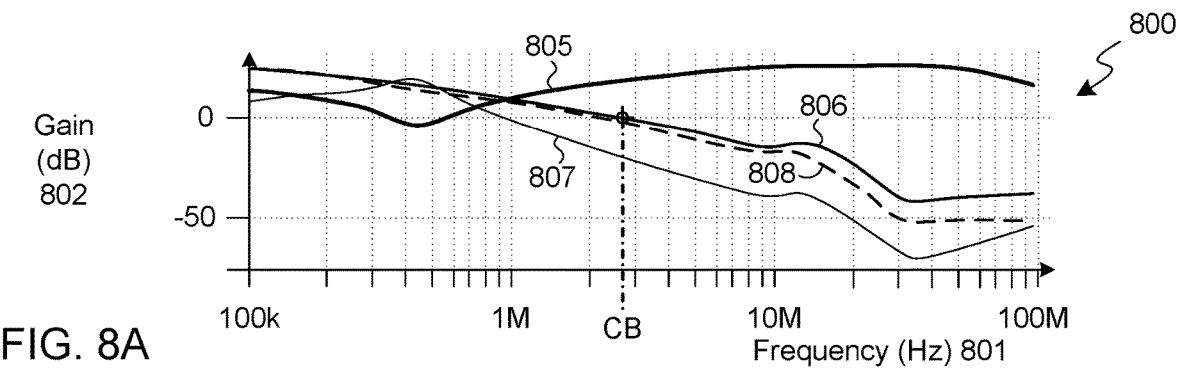
FIGS. 8A through 8D show graphs diagrams each illustrating characteristics of a voltage regulator mode for operation with a high impedance circuit board according to a corresponding embodiment.

Graphs 800, 810, 820, 830 variously illustrate frequency response characteristics of a VR which is delivering power via a power delivery network that has been classified as exhibiting high-level parasitics, where the operational mode of the VR is based on said classification. FIG. 8A shows a graph 800 which includes plots 805, 806, 807 each for respective magnitudes of a gain 802 over a range of frequencies 801. More particularly, plots 805, 806, 807 represent the VR's compensator gain (Gc), loop gain (GcGp), and power stage gain (Gp), respectively.

Figure 8B:
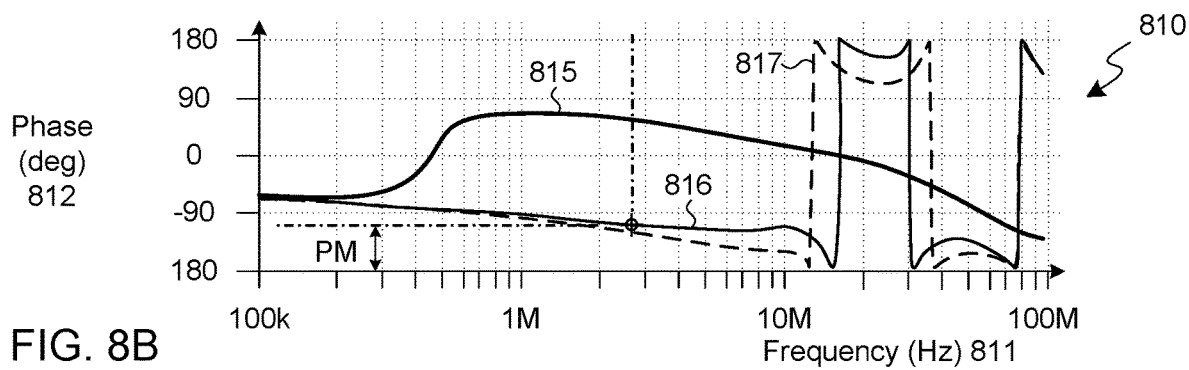
Figure 8C:
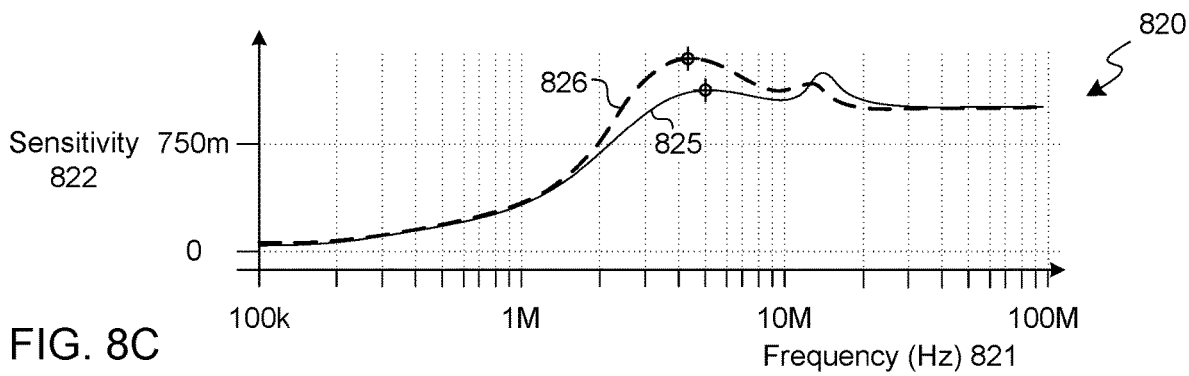
Figure 8D:
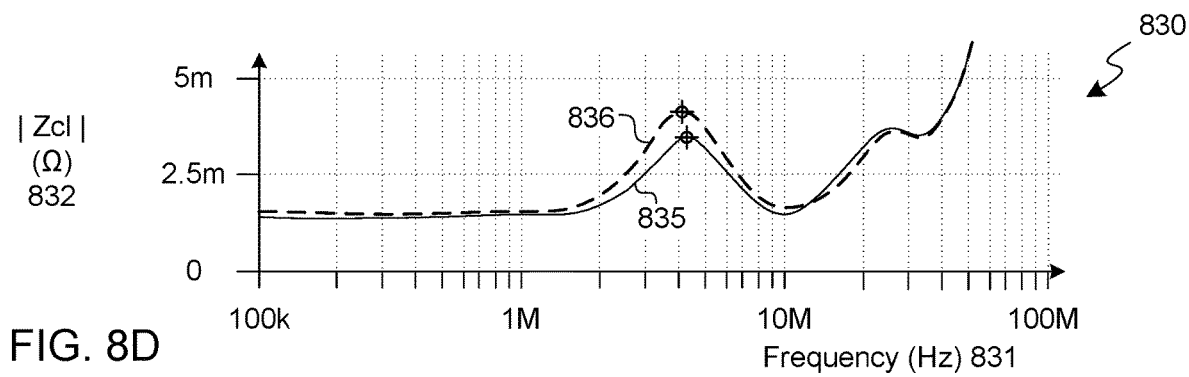

FIG. 8B shows a graph 810 which includes plots 815, 816 each for respective amounts of a phase 812 over a range of frequencies 811. More particularly, plots 815, 816 represent the respective phase response characteristics corresponding to the compensator gain (Gc), and loop gain (GcGp). FIG. 8C shows a graph 820 which includes a plot 825 for levels of a sensitivity 822 of the VR over a range of frequencies 821. FIG. 8D shows a graph 830 which includes a plot 835 for levels of the impedance |Zc1| 832 over a range of frequencies 831.

FIGS. 8A, 8B, 8C, 8D also show respective superimposed plots 808, 817, 826, 836 which variously represent characteristics of power delivery while the VR operates based on a mode which corresponds to relatively low impedance characteristics—i.e., despite the fact that a PDN on a PCB (or other such substrate) has relatively high impedance characteristics.

In various embodiments, a first VR mode—which provides a first frequency response profile represented in graphs 600, 610, 620, 630—corresponds to a relatively low impedance level of a PDN. Furthermore, a second VR mode—which provides a second frequency response profile represented in graphs 800, 810, 820, 830—corresponds to a relatively high impedance level of the PDN.

In an illustrative scenario according to one such embodiment, a first delivery of power—with a substrate, and a VR based on the first VR mode—corresponds to a first control bandwidth (CB), and a first frequency response (e.g., as indicated by plot 826) of a sensitivity of the VR. In an alternative scenario, a second power delivery—with the substrate, and the VR based on the second VR mode—corresponds to a second control bandwidth, and a second frequency response of the sensitivity (as indicated by plot 825). A review of graph 820 reveals that, in a range of frequencies above the control bandwidth (CB) shown for plot 805, a first local peak of the first frequency response in plot 826 is greater than a second local peak of the second frequency response in plot 825.

In one such embodiment, the first delivery of power further corresponds to a third frequency response of the impedance |Zc1| (as indicated in plot 836), whereas the second delivery of power further corresponds to a fourth frequency response of the impedance (as indicated by plot 835). A review of graph 830 reveals that, in the range of frequencies above the control bandwidth (CB) shown for plot 805, a local peak of the frequency response for plot 836 is greater than a local peak of the frequency response for plot 835.

Accordingly, some embodiments variously provide a plurality of VR modes which are selectable based on PCB impedance characteristics, and which include the above-described second VR mode which—as compared to the first VR mode—provides a frequency response profile which (for higher frequencies) has a relatively more stable sensitivity function, and a lower impedance. This is to be distinguished, for example, from various conventional VR control techniques which are more narrowly directed at achieving a maximum possible control bandwidth.

Figure 9:
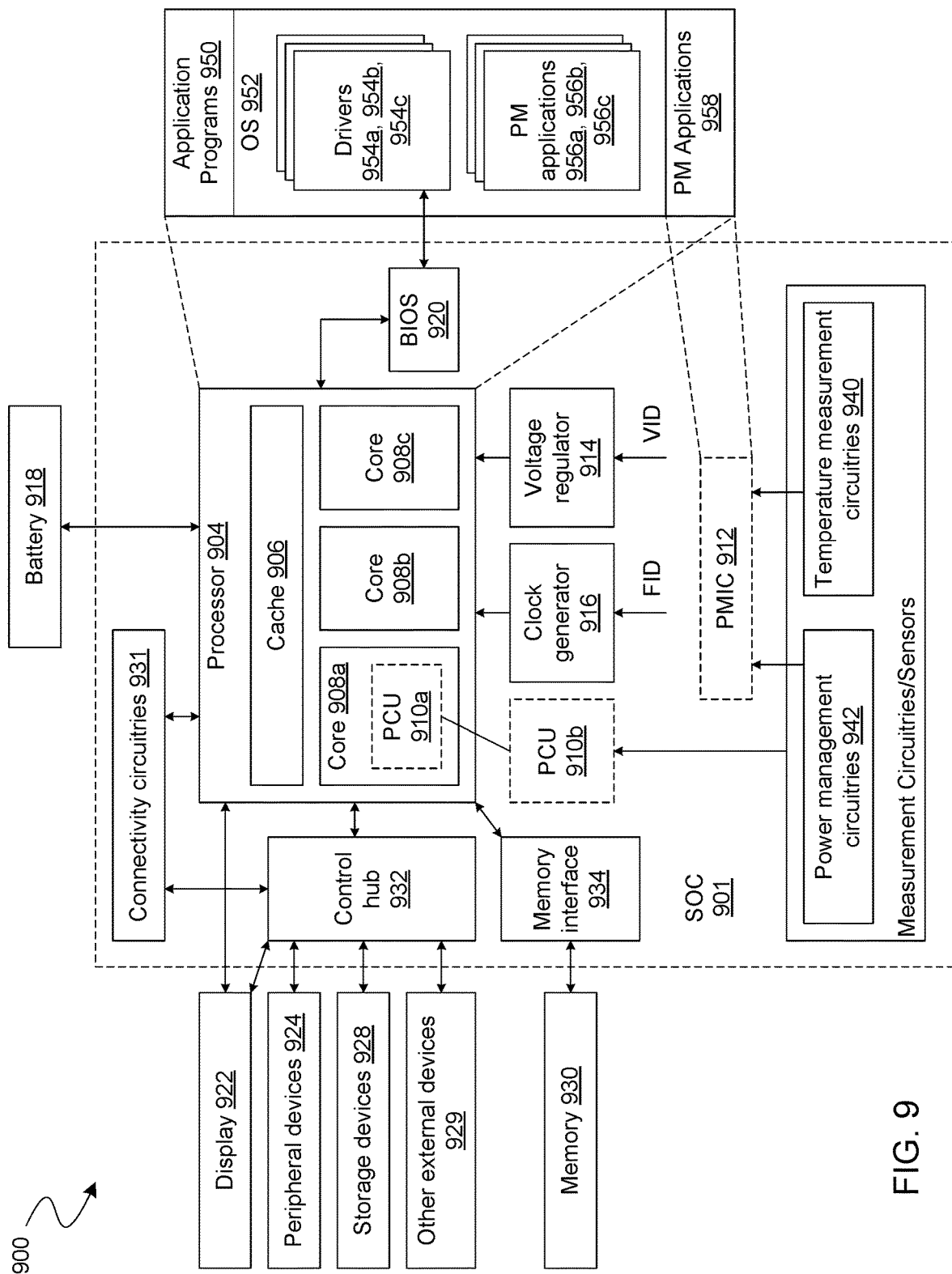
FIG. 9 is a functional block diagram illustrating a computing device built in accordance with an embodiment.

FIG. 9 illustrates a computer system or computing device 900 (also referred to as device 900), where a controller determines a mode of a voltage regulator, in accordance with some embodiments. It is pointed out that those elements of FIG. 9 having the same reference numbers (or names) as the elements of any other figure can operate or function in any manner similar to that described, but are not limited to such.

In some embodiments, device 900 represents an appropriate computing device, such as a computing tablet, a mobile phone or smart-phone, a laptop, a desktop, an Internet-of-Things (JOT) device, a server, a wearable device, a set-top box, a wireless-enabled e-reader, or the like. It will be understood that certain components are shown generally, and not all components of such a device are shown in device 900.

In an example, the device 900 comprises a SoC (System-on-Chip) 901. An example boundary of the SOC 901 is illustrated using dotted lines in FIG. 9, with some example components being illustrated to be included within SOC 901—however, SOC 901 may include any appropriate components of device 900.

In some embodiments, device 900 includes processor 904. Processor 2110 can include one or more physical devices, such as microprocessors, application processors, microcontrollers, programmable logic devices, processing cores, or other processing means. The processing operations performed by processor 904 include the execution of an operating platform or operating system on which applications and/or device functions are executed. The processing operations include operations related to I/O (input/output) with a human user or with other devices, operations related to power management, operations related to connecting computing device 900 to another device, and/or the like. The processing operations may also include operations related to audio I/O and/or display I/O.

In some embodiments, processor 904 includes multiple processing cores (also referred to as cores) 908*a*, 908*b*, 908*c*. Although merely three cores 908*a*, 908*b*, 908*c* are illustrated in FIG. 9, the processor 904 may include any other appropriate number of processing cores, e.g., tens, or even hundreds of processing cores. Processor cores 908*a*, 908*b*, 908*c* may be implemented on a single integrated circuit (IC) chip. Moreover, the chip may include one or more shared and/or private caches, buses or interconnections, graphics and/or memory controllers, or other components.

In some embodiments, processor 904 includes cache 906. In an example, sections of cache 906 may be dedicated to individual cores 908 (e.g., a first section of cache 906 dedicated to core 908*a*, a second section of cache 906 dedicated to core 908*b*, and so on). In an example, one or more sections of cache 906 may be shared among two or more of cores 908. Cache 906 may be split in different levels, e.g., level 1 (L1) cache, level 2 (L2) cache, level 3 (L3) cache, etc.

In some embodiments, a given processor core (e.g., core 908*a*) may include a fetch unit to fetch instructions (including instructions with conditional branches) for execution by the core 908*a*. The instructions may be fetched from any storage devices such as the memory 930. Processor core 908*a* may also include a decode unit to decode the fetched instruction. For example, the decode unit may decode the fetched instruction into a plurality of micro-operations. Processor core 908*a* may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 908*a* (for example) may be an out-of-order processor core in one embodiment. Processor core 908*a* may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 908*a* may also include a bus unit to enable communication between components of the processor core 908*a* and other components via one or more buses. Processor core 908*a* may also include one or more registers to store data accessed by various components of the core 908*a* (such as values related to assigned app priorities and/or sub-system states (modes) association.

In some embodiments, device 900 comprises connectivity circuitries 931. For example, connectivity circuitries 931 includes hardware devices (e.g., wireless and/or wired connectors and communication hardware) and/or software components (e.g., drivers, protocol stacks), e.g., to enable device 900 to communicate with external devices. Device 900 may be separate from the external devices, such as other computing devices, wireless access points or base stations, etc.

In an example, connectivity circuitries 931 may include multiple different types of connectivity. To generalize, the connectivity circuitries 931 may include cellular connectivity circuitries, wireless connectivity circuitries, etc. Cellular connectivity circuitries of connectivity circuitries 931 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 931 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 931 may include a network interface, such as a wired or wireless interface, e.g., so that a system embodiment may be incorporated into a wireless device, for example, cell phone or personal digital assistant.

In some embodiments, device 900 comprises control hub 932, which represents hardware devices and/or software components related to interaction with one or more I/O devices. For example, processor 904 may communicate with one or more of display 922, one or more peripheral devices 924, storage devices 928, one or more other external devices 929, etc., via control hub 932. Control hub 932 may be a chipset, a Platform Control Hub (PCH), and/or the like.

For example, control hub 932 illustrates one or more connection points for additional devices that connect to device 900, e.g., through which a user might interact with the system. For example, devices (e.g., devices 929) that can be attached to device 900 include microphone devices, speaker or stereo systems, audio devices, video systems or other display devices, keyboard or keypad devices, or other I/O devices for use with specific applications such as card readers or other devices.

As mentioned above, control hub 932 can interact with audio devices, display 922, etc. For example, input through a microphone or other audio device can provide input or commands for one or more applications or functions of device 900. Additionally, audio output can be provided instead of, or in addition to display output. In another example, if display 922 includes a touch screen, display 922 also acts as an input device, which can be at least partially managed by control hub 932. There can also be additional buttons or switches on computing device 900 to provide I/O functions managed by control hub 932. In one embodiment, control hub 932 manages devices such as accelerometers, cameras, light sensors or other environmental sensors, or other hardware that can be included in device 900. The input can be part of direct user interaction, as well as providing environmental input to the system to influence its operations (such as filtering for noise, adjusting displays for brightness detection, applying a flash for a camera, or other features).

In some embodiments, control hub 932 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 922 represents hardware (e.g., display devices) and software (e.g., drivers) components that provide a visual and/or tactile display for a user to interact with device 900. Display 922 may include a display interface, a display screen, and/or hardware device used to provide a display to a user. In some embodiments, display 922 includes a touch screen (or touch pad) device that provides both output and input to a user. In an example, display 922 may communicate directly with the processor 904. Display 922 can be one or more of an internal display device, as in a mobile electronic device or a laptop device or an external display device attached via a display interface (e.g., DisplayPort, etc.). In one embodiment display 922 can be a head mounted display (HMD) such as a stereoscopic display device for use in virtual reality (VR) applications or augmented reality (AR) applications.

In some embodiments and although not illustrated in the figure, in addition to (or instead of) processor 904, device 900 may include Graphics Processing Unit (GPU) comprising one or more graphics processing cores, which may control one or more aspects of displaying contents on display 922.

Control hub 932 (or platform controller hub) may include hardware interfaces and connectors, as well as software components (e.g., drivers, protocol stacks) to make peripheral connections, e.g., to peripheral devices 924.

It will be understood that device 900 could both be a peripheral device to other computing devices, as well as have peripheral devices connected to it. Device 900 may have a "docking" connector to connect to other computing devices for purposes such as managing (e.g., downloading and/or uploading, changing, synchronizing) content on device 900. Additionally, a docking connector can allow device 900 to connect to certain peripherals that allow computing device 900 to control content output, for example, to audiovisual or other systems.

In addition to a proprietary docking connector or other proprietary connection hardware, device 900 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 931 may be coupled to control hub 932, e.g., in addition to, or instead of, being coupled directly to the processor 904. In some embodiments, display 922 may be coupled to control hub 932, e.g., in addition to, or instead of, being coupled directly to processor 904.

In some embodiments, device 900 comprises memory 930 coupled to processor 904 via memory interface 934. Memory 930 includes memory devices for storing information in device 900. Memory can include nonvolatile (state does not change if power to the memory device is interrupted) and/or volatile (state is indeterminate if power to the memory device is interrupted) memory devices. Memory device 930 can be a dynamic random access memory (DRAM) device, a static random access memory (SRAM) device, flash memory device, phase-change memory device, or some other memory device having suitable performance to serve as process memory. In one embodiment, memory 930 can operate as system memory for device 900, to store data and instructions for use when the one or more processors 904 executes an application or process. Memory 930 can store application data, user data, music, photos, documents, or other data, as well as system data (whether long-term or temporary) related to the execution of the applications and functions of device 900.

Elements of various embodiments and examples are also provided as a machine-readable medium (e.g., memory 930) for storing the computer-executable instructions (e.g., instructions to implement any other processes discussed herein). The machine-readable medium (e.g., memory 930) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 900 comprises temperature measurement circuitries 940, e.g., for measuring temperature of various components of device 900. In an example, temperature measurement circuitries 940 may be embedded, or coupled or attached to various components, whose temperature are to be measured and monitored. For example, temperature measurement circuitries 940 may measure temperature of (or within) one or more of cores 908*a*, 908*b*, 908*c*, voltage regulator 914, memory 930, a mother-board of SOC 901, and/or any appropriate component of device 900.

In some embodiments, device 900 comprises power measurement circuitries 942, e.g., for measuring power consumed by one or more components of the device 900. In an example, in addition to, or instead of, measuring power, the power measurement circuitries 942 may measure voltage and/or current. In an example, the power measurement circuitries 942 may be embedded, or coupled or attached to various components, whose power, voltage, and/or current consumption are to be measured and monitored. For example, power measurement circuitries 942 may measure power, current and/or voltage supplied by one or more voltage regulators 914, power supplied to SOC 901, power supplied to device 900, power consumed by processor 904 (or any other component) of device 900, etc.

In some embodiments, device 900 comprises one or more voltage regulator circuitries, generally referred to as voltage regulator (VR) 914. VR 914 generates signals at appropriate voltage levels, which may be supplied to operate any appropriate components of the device 900. Merely as an example, VR 914 is illustrated to be supplying signals to processor 904 of device 900. In some embodiments, VR 914 receives one or more Voltage Identification (VID) signals, and generates the voltage signal at an appropriate level, based on the VID signals. Various type of VRs may be utilized for the VR 914. For example, VR 914 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 910*a/b* and/or PMIC 912. In some embodiments, each core has a network of distributed LDOs to provide efficient control for power management. The LDOs can be digital, analog, or a combination of digital or analog LDOs.

In some embodiments, device 900 comprises one or more clock generator circuitries, generally referred to as clock generator 916. Clock generator 916 generates clock signals at appropriate frequency levels, which may be supplied to any appropriate components of device 900. Merely as an example, clock generator 916 is illustrated to be supplying clock signals to processor 904 of device 900. In some embodiments, clock generator 916 receives one or more Frequency Identification (FID) signals, and generates the clock signals at an appropriate frequency, based on the FID signals.

In some embodiments, device 900 comprises battery 918 supplying power to various components of device 900. Merely as an example, battery 918 is illustrated to be supplying power to processor 904. Although not illustrated in the figures, device 900 may comprise a charging circuitry, e.g., to recharge the battery, based on Alternating Current (AC) power supply received from an AC adapter.

In some embodiments, device 900 comprises Power Control Unit (PCU) 910 (also referred to as Power Management Unit (PMU), Power Controller, etc.). In an example, some sections of PCU 910 may be implemented by one or more processing cores 908, and these sections of PCU 910 are symbolically illustrated using a dotted box and labelled PCU 910*a*. In an example, some other sections of PCU 910 may be implemented outside the processing cores 908, and these sections of PCU 910 are symbolically illustrated using a dotted box and labelled as PCU 910*b*. PCU 910 may implement various power management operations for device 900. PCU 910 may include hardware interfaces, hardware circuitries, connectors, registers, etc., as well as software components (e.g., drivers, protocol stacks), to implement various power management operations for device 900.

In some embodiments, device 900 comprises Power Management Integrated Circuit (PMIC) 912, e.g., to implement various power management operations for device 900. In some embodiments, PMIC 912 is a Reconfigurable Power Management ICs (RPMICs) and/or an IMVP (Intel® Mobile Voltage Positioning). In an example, the PMIC is within an IC chip separate from processor 904. The may implement various power management operations for device 900. PMIC 912 may include hardware interfaces, hardware circuitries, connectors, registers, etc., as well as software components (e.g., drivers, protocol stacks), to implement various power management operations for device 900.

In an example, device 900 comprises one or both PCU 910 or PMIC 912. In an example, any one of PCU 910 or PMIC 912 may be absent in device 900, and hence, these components are illustrated using dotted lines.

Various power management operations of device 900 may be performed by PCU 910, by PMIC 912, or by a combination of PCU 910 and PMIC 912. For example, PCU 910 and/or PMIC 912 may select a power state (e.g., P-state) for various components of device 900. For example, PCU 910 and/or PMIC 912 may select a power state (e.g., in accordance with the ACPI (Advanced Configuration and Power Interface) specification) for various components of device 900. Merely as an example, PCU 910 and/or PMIC 912 may cause various components of the device 900 to transition to a sleep state, to an active state, to an appropriate C state (e.g., C0 state, or another appropriate C state, in accordance with the ACPI specification), etc. In an example, PCU 910 and/or PMIC 912 may control a voltage output by VR 914 and/or a frequency of a clock signal output by the clock generator, e.g., by outputting the VID signal and/or the FID signal, respectively. In an example, PCU 910 and/or PMIC 912 may control battery power usage, charging of battery 918, and features related to power saving operation.

The clock generator 916 can comprise a phase locked loop (PLL), frequency locked loop (FLL), or any suitable clock source. In some embodiments, each core of processor 904 has its own clock source. As such, each core can operate at a frequency independent of the frequency of operation of the other core. In some embodiments, PCU 910 and/or PMIC 912 performs adaptive or dynamic frequency scaling or adjustment. For example, clock frequency of a processor core can be increased if the core is not operating at its maximum power consumption threshold or limit. In some embodiments, PCU 910 and/or PMIC 912 determines the operating condition of each core of a processor, and opportunistically adjusts frequency and/or power supply voltage of that core without the core clocking source (e.g., PLL of that core) losing lock when the PCU 910 and/or PMIC 912 determines that the core is operating below a target performance level. For example, if a core is drawing current from a power supply rail less than a total current allocated for that core or processor 904, then PCU 910 and/or PMIC 912 can temporarily increase the power draw for that core or processor 904 (e.g., by increasing clock frequency and/or power supply voltage level) so that the core or processor 904 can perform at a higher performance level. As such, voltage and/or frequency can be increased temporality for processor 904 without violating product reliability.

In an example, PCU 910 and/or PMIC 912 may perform power management operations, e.g., based at least in part on receiving measurements from power measurement circuitries 942, temperature measurement circuitries 940, charge level of battery 918, and/or any other appropriate information that may be used for power management. To that end, PMIC 912 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 910 and/or PMIC 912 in at least one embodiment to allow PCU 910 and/or PMIC 912 to manage processor core energy at least in part based on value(s) detected by one or more of the sensors.

Also illustrated is an example software stack of device 900 (although not all elements of the software stack are illustrated). Merely as an example, processors 904 may execute application programs 950, Operating System 952, one or more Power Management (PM) specific application programs (e.g., generically referred to as PM applications 958), and/or the like. PM applications 958 may also be executed by the PCU 910 and/or PMIC 912. OS 952 may also include one or more PM applications 956a, 956b, 956c. The OS 952 may also include various drivers 954a, 954b, 954c, etc., some of which may be specific for power management purposes. In some embodiments, device 900 may further comprise a Basic Input/Output System (BIOS) 920. BIOS 920 may communicate with OS 952 (e.g., via one or more drivers 954), communicate with processors 904, etc.

For example, one or more of PM applications 958, 956, drivers 954, BIOS 920, etc. may be used to implement power management specific tasks, e.g., to control voltage and/or frequency of various components of device 900, to control wake-up state, sleep state, and/or any other appropriate power state of various components of device 900, control battery power usage, charging of the battery 918, features related to power saving operation, etc.

In one or more first embodiments, an integrated circuit (IC) comprises first circuitry to receive an identifier of a first parasitic impedance characteristic of a substrate, second circuitry to perform a selection, based on the identifier, one mode from among a plurality of modes of a voltage regulator (VR) coupled to the substrate, and third circuitry to signal the VR, based on the selection, to set the one mode, wherein a first mode of the plurality of modes corresponds to a first impedance level, wherein a second mode of the plurality of modes corresponds to a second impedance level which is greater than the first impedance level, wherein a power delivery with the substrate and the VR based on the first mode corresponds to a first control bandwidth frequency, and a first frequency response of a sensitivity of the VR, wherein a power delivery with the substrate and the VR based on the second mode corresponds to a second control bandwidth frequency, and a second frequency response of the sensitivity, and wherein, in a range of frequencies above the second control bandwidth frequency, a first local peak of the first frequency response is greater than a second local peak of the second frequency response.

In one or more second embodiments, further to the first embodiment, power delivery with the substrate and the VR based on the first mode further corresponds to a third frequency response of an impedance from an IC die to the VR, power delivery with the substrate and the VR based on the second mode further corresponds to a fourth frequency response of the impedance, and in the range of frequencies above the second control bandwidth frequency, a third local peak of the third frequency response is greater than a fourth local peak of the fourth frequency response.

In one or more third embodiments, further to the first embodiment or the second embodiment, the VR comprises a compensator unit, wherein the third circuitry to signal the VR to set the mode comprises the third circuitry to identify a respective setting for each of one or more variable circuit elements of the compensator unit.

In one or more fourth embodiments, further to any of the first through third embodiments, the third circuitry to signal the VR to set the mode comprises the third circuitry to identify one or more values each corresponding to a respective coefficient of a digital filter.

In one or more fifth embodiments, further to any of the first through fourth embodiments, the plurality of modes further comprises a third mode which corresponds to a third impedance level which is between the first impedance level and the second impedance level.

In one or more sixth embodiments, further to any of the first through fifth embodiments, the second circuitry to select the one mode comprises the second circuitry to access reference information at the IC, wherein the reference information identifies a correspondence of multiple parasitic impedance characteristics each with a different respective mode of the plurality of modes.

In one or more seventh embodiments, further to any of the first through sixth embodiments, the identifier is generated with one or more fuses of the substrate.

In one or more eighth embodiments, further to any of the first through seventh embodiments, the substrate comprises a printed circuit board.

In one or more ninth embodiments, a system comprises a printed circuit board (PCB), a voltage regulator (VR) coupled to the PCB, and an IC coupled to the VR, the IC die comprising first circuitry to receive an identifier of a first parasitic impedance characteristic of the PCB, second circuitry to perform a selection, based on the identifier, one mode from among a plurality of modes of the VR, and third circuitry to signal the VR, based on the selection, to set the one mode, wherein a first mode of the plurality of modes corresponds to a first impedance level, wherein a second mode of the plurality of modes corresponds to a second impedance level which is greater than the first impedance level, wherein a power delivery with the PCB and the VR based on the first mode corresponds to a first control bandwidth frequency, and a first frequency response of a sensitivity of the VR, wherein a power delivery with the PCB and the VR based on the second mode corresponds to a second control bandwidth frequency, and a second frequency response of the sensitivity, and wherein, in a range of frequencies above the second control bandwidth frequency, a first local peak of the first frequency response is greater than a second local peak of the second frequency response.

In one or more tenth embodiments, further to the ninth embodiment, power delivery with the substrate and the VR based on the first mode further corresponds to a third frequency response of an impedance from the IC die to the VR, power delivery with the substrate and the VR based on the second mode further corresponds to a fourth frequency response of the impedance, and in the range of frequencies above the second control bandwidth frequency, a third local peak of the third frequency response is greater than a fourth local peak of the fourth frequency response.

In one or more eleventh embodiments, further to the ninth embodiment or the tenth embodiment, the VR comprises a compensator unit, wherein the third circuitry to signal the VR to set the mode comprises the third circuitry to identify a respective setting for each of one or more variable circuit elements of the compensator unit.

In one or more twelfth embodiments, further to any of the ninth through eleventh embodiments, the third circuitry to signal the VR to set the mode comprises the third circuitry to identify one or more values each corresponding to a respective coefficient of a digital filter.

In one or more thirteenth embodiments, further to any of the ninth through twelfth embodiments, the plurality of modes further comprises a third mode which corresponds to a third impedance level which is between the first impedance level and the second impedance level.

In one or more fourteenth embodiments, further to any of the ninth through thirteenth embodiments, the second circuitry to select the one mode comprises the second circuitry to access reference information at the IC, wherein the reference information identifies a correspondence of multiple parasitic impedance characteristics each with a different respective mode of the plurality of modes.

In one or more fifteenth embodiments, further to any of the ninth through fourteenth embodiments, the identifier is generated with one or more fuses of the substrate.

In one or more sixteenth embodiments, further to any of the ninth through fifteenth embodiments, the substrate comprises a printed circuit board.

In one or more seventeenth embodiments, an integrated circuit (IC) comprises first circuitry to receive an identifier of a first parasitic impedance characteristic of a power delivery network (PDN) comprising circuitry on a printed circuit board (PCB), second circuitry to perform a selection, based on the identifier, one mode from among a plurality of modes of a voltage regulator (VR) coupled to the PDN, and third circuitry to signal the VR, based on the selection, to set the one mode, wherein a first mode of the plurality of modes corresponds to a first impedance level, wherein a second mode of the plurality of modes corresponds to a second impedance level which is greater than the first impedance level, wherein a power delivery with the PDN and the VR based on the first mode corresponds to a first control bandwidth frequency, and a first frequency response of a sensitivity of the VR, wherein a power delivery with the PDN and the VR based on the second mode corresponds to a second control bandwidth frequency, and a second frequency response of the sensitivity, and wherein, in a range of frequencies above the second control bandwidth frequency, a first local peak of the first frequency response is greater than a second local peak of the second frequency response.

In one or more eighteenth embodiments, further to the seventeenth embodiment, power delivery with the PDN and the VR based on the first mode further corresponds to a third frequency response of an impedance from an IC die to the VR, power delivery with the PDN and the VR based on the second mode further corresponds to a fourth frequency response of the impedance, and in the range of frequencies above the second control bandwidth frequency, a third local peak of the third frequency response is greater than a fourth local peak of the fourth frequency response.

In one or more nineteenth embodiments, further to the seventeenth embodiment or the eighteenth embodiment, the VR comprises a compensator unit, wherein the third circuitry to signal the VR to set the mode comprises the third circuitry to identify a respective setting for each of one or more variable circuit elements of the compensator unit.

In one or more twentieth embodiments, further to any of the seventeenth through nineteenth embodiments, the third circuitry to signal the VR to set the mode comprises the third circuitry to identify one or more values each corresponding to a respective coefficient of a digital filter.

In one or more twenty-first embodiments, further to any of the seventeenth through twentieth embodiments, the plurality of modes further comprises a third mode which corresponds to a third impedance level which is between the first impedance level and the second impedance level.

In one or more twenty-second embodiments, further to any of the seventeenth through twenty-first embodiments, the second circuitry to select the one mode comprises the second circuitry to access reference information at the IC, wherein the reference information identifies a correspondence of multiple parasitic impedance characteristics each with a different respective mode of the plurality of modes.

In one or more twenty-third embodiments, further to any of the seventeenth through twenty-second embodiments, the identifier is generated with one or more fuses of the PDN.

In one or more twenty-fourth embodiments, a method at an integrated circuit (IC), the method comprises receiving an identifier of a first parasitic impedance characteristic of a substrate, based on the identifier, selecting one mode from among a plurality of modes of a voltage regulator (VR) coupled to the substrate, based on the selecting, signaling the VR to set the one mode, wherein a first mode of the plurality of modes corresponds to a first impedance level, wherein a second mode of the plurality of modes corresponds to a second impedance level which is greater than the first impedance level, wherein a power delivery with the substrate and the VR based on the first mode corresponds to a first control bandwidth frequency, and a first frequency response of a sensitivity of the VR, wherein a power delivery with the substrate and the VR based on the second mode corresponds to a second control bandwidth frequency, and a second frequency response of the sensitivity, and wherein, in a range of frequencies above the second control bandwidth frequency, a first local peak of the first frequency response is greater than a second local peak of the second frequency response.

In one or more twenty-fifth embodiments, further to the twenty-fourth embodiment, power delivery with the substrate and the VR based on the first mode further corresponds to a third frequency response of an impedance from an IC die to the VR, power delivery with the substrate and the VR based on the second mode further corresponds to a fourth frequency response of the impedance, and in the range of frequencies above the second control bandwidth frequency, a third local peak of the third frequency response is greater than a fourth local peak of the fourth frequency response.

In one or more twenty-sixth embodiments, further to the twenty-fourth embodiment or the twenty-fifth embodiment, the VR comprises a compensator unit, wherein signaling the VR to set the mode comprises identifying a respective setting for each of one or more variable circuit elements of the compensator unit.

In one or more twenty-seventh embodiments, further to any of the twenty-fourth through twenty-sixth embodiments, signaling the VR to set the mode comprises identifying one or more values each corresponding to a respective coefficient of a digital filter.

In one or more twenty-eighth embodiments, further to any of the twenty-fourth through twenty-seventh embodiments, the plurality of modes further comprises a third mode which corresponds to a third impedance level which is between the first impedance level and the second impedance level.

In one or more twenty-ninth embodiments, further to any of the twenty-fourth through twenty-eighth embodiments, selecting the one mode comprises accessing reference information at the IC, wherein the reference information identifies a correspondence of multiple parasitic impedance characteristics each with a different respective mode of the plurality of modes.

In one or more thirtieth embodiments, further to any of the twenty-fourth through twenty-ninth embodiments, the identifier is generated with one or more fuses of the substrate.

In one or more thirty-first embodiments, further to any of the twenty-fourth through thirtieth embodiments, the substrate comprises a printed circuit board.

In one or more thirty-second embodiments, one or more non-transitory computer-readable storage media having stored thereon instructions which, when executed by one or more processing units, cause the one or more processing units to perform a method comprising receiving an identifier of a first parasitic impedance characteristic of a substrate, based on the identifier, selecting one mode from among a plurality of modes of a voltage regulator (VR) coupled to the substrate, based on the selecting, signaling the VR to set the one mode, wherein a first mode of the plurality of modes corresponds to a first impedance level, wherein a second mode of the plurality of modes corresponds to a second impedance level which is greater than the first impedance level, wherein a power delivery with the substrate and the VR based on the first mode corresponds to a first control bandwidth frequency, and a first frequency response of a sensitivity of the VR, wherein a power delivery with the substrate and the VR based on the second mode corresponds to a second control bandwidth frequency, and a second frequency response of the sensitivity, and wherein, in a range of frequencies above the second control bandwidth frequency, a first local peak of the first frequency response is greater than a second local peak of the second frequency response.

In one or more thirty-third embodiments, further to the thirty-second embodiment, power delivery with the substrate and the VR based on the first mode further corresponds to a third frequency response of an impedance from an IC die to the VR, power delivery with the substrate and the VR based on the second mode further corresponds to a fourth frequency response of the impedance, and in the range of frequencies above the second control bandwidth frequency, a third local peak of the third frequency response is greater than a fourth local peak of the fourth frequency response.

In one or more thirty-fourth embodiments, further to the thirty-second embodiment or the thirty-third embodiment, the VR comprises a compensator unit, wherein signaling the VR to set the mode comprises identifying a respective setting for each of one or more variable circuit elements of the compensator unit.

In one or more thirty-fifth embodiments, further to any of the thirty-second through thirty-fourth embodiments, signaling the VR to set the mode comprises identifying one or more values each corresponding to a respective coefficient of a digital filter.

In one or more thirty-sixth embodiments, further to any of the thirty-second through thirty-fifth embodiments, the plurality of modes further comprises a third mode which corresponds to a third impedance level which is between the first impedance level and the second impedance level.

In one or more thirty-seventh embodiments, further to any of the thirty-second through thirty-sixth embodiments, selecting the one mode comprises accessing reference information which identifies a correspondence of multiple parasitic impedance characteristics each with a different respective mode of the plurality of modes.

In one or more thirty-eighth embodiments, further to any of the thirty-second through thirty-seventh embodiments, the identifier is generated with one or more fuses of the substrate.

In one or more thirty-ninth embodiments, further to any of the thirty-second through thirty-seventh embodiments, the substrate comprises a printed circuit board.

Techniques and architectures for controlling operations of a voltage regulator are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit (IC) comprising:
    first circuitry to receive an identifier of a first parasitic impedance characteristic of a substrate;
    second circuitry to perform a selection, based on the identifier, one mode from among a plurality of modes of a voltage regulator (VR) coupled to the substrate; and
    third circuitry to signal the VR, based on the selection, to set the one mode;
    wherein a first mode of the plurality of modes corresponds to a first impedance level;
    wherein a second mode of the plurality of modes corresponds to a second impedance level which is greater than the first impedance level;
    wherein a power delivery with the substrate and the VR based on the first mode corresponds to a first control bandwidth frequency, and a first frequency response of a sensitivity of the VR;
    wherein a power delivery with the substrate and the VR based on the second mode corresponds to a second control bandwidth frequency, and a second frequency response of the sensitivity; and
    wherein, in a range of frequencies above the second control bandwidth frequency, a first local peak of the first frequency response is greater than a second local peak of the second frequency response.

2. The IC of claim 1, wherein:
    power delivery with the substrate and the VR based on the first mode further corresponds to a third frequency response of an impedance from the IC to the VR;
    power delivery with the substrate and the VR based on the second mode further corresponds to a fourth frequency response of the impedance; and
    in the range of frequencies above the second control bandwidth frequency, a third local peak of the third frequency response is greater than a fourth local peak of the fourth frequency response.

3. The IC of claim 1, wherein the VR comprises a compensator unit;
    wherein the third circuitry to signal the VR to set the mode comprises the third circuitry to identify a respective setting for each of one or more variable circuit elements of the compensator unit.

4. The IC of claim 1, wherein the third circuitry to signal the VR to set the mode comprises the third circuitry to identify one or more values each corresponding to a respective coefficient of a digital filter.

5. The IC of claim 1, wherein the plurality of modes further comprises a third mode which corresponds to a third impedance level which is between the first impedance level and the second impedance level.

6. The IC of claim 1, wherein the second circuitry to select the one mode comprises the second circuitry to access reference information at the IC, wherein the reference information identifies a correspondence of multiple parasitic impedance characteristics each with a different respective mode of the plurality of modes.

7. The IC of claim 1, wherein the identifier is generated with one or more fuses of the substrate.

8. The IC of claim 1, wherein the substrate comprises a printed circuit board.

9. A system comprising:
    a printed circuit board (PCB);
    a voltage regulator (VR) coupled to the PCB; and
    an IC coupled to the VR, the IC comprising:
        first circuitry to receive an identifier of a first parasitic impedance characteristic of the PCB;
        second circuitry to perform a selection, based on the identifier, one mode from among a plurality of modes of the VR; and
        third circuitry to signal the VR, based on the selection, to set the one mode;

wherein a first mode of the plurality of modes corresponds to a first impedance level;
wherein a second mode of the plurality of modes corresponds to a second impedance level which is greater than the first impedance level;
wherein a power delivery with the PCB and the VR based on the first mode corresponds to a first control bandwidth frequency, and a first frequency response of a sensitivity of the VR;
wherein a power delivery with the PCB and the VR based on the second mode corresponds to a second control bandwidth frequency, and a second frequency response of the sensitivity; and
wherein, in a range of frequencies above the second control bandwidth frequency, a first local peak of the first frequency response is greater than a second local peak of the second frequency response.

10. The system of claim 9, wherein:
power delivery with the substrate and the VR based on the first mode further corresponds to a third frequency response of an impedance from the IC to the VR;
power delivery with the substrate and the VR based on the second mode further corresponds to a fourth frequency response of the impedance; and
in the range of frequencies above the second control bandwidth frequency, a third local peak of the third frequency response is greater than a fourth local peak of the fourth frequency response.

11. The system of claim 9, wherein the VR comprises a compensator unit;
wherein the third circuitry to signal the VR to set the mode comprises the third circuitry to identify a respective setting for each of one or more variable circuit elements of the compensator unit.

12. The system of claim 9, wherein the third circuitry to signal the VR to set the mode comprises the third circuitry to identify one or more values each corresponding to a respective coefficient of a digital filter.

13. The system of claim 9, wherein the plurality of modes further comprises a third mode which corresponds to a third impedance level which is between the first impedance level and the second impedance level.

14. The system of claim 9, wherein the second circuitry to select the one mode comprises the second circuitry to access reference information at the IC, wherein the reference information identifies a correspondence of multiple parasitic impedance characteristics each with a different respective mode of the plurality of modes.

15. The system of claim 9, wherein the identifier is generated with one or more fuses of the substrate.

16. The system of claim 9, wherein the substrate comprises a printed circuit board.

17. An integrated circuit (IC) comprising:
first circuitry to receive an identifier of a first parasitic impedance characteristic of a power delivery network (PDN) comprising circuitry on a printed circuit board (PCB);
second circuitry to perform a selection, based on the identifier, one mode from among a plurality of modes of a voltage regulator (VR) coupled to the PDN; and
third circuitry to signal the VR, based on the selection, to set the one mode;
wherein a first mode of the plurality of modes corresponds to a first impedance level;
wherein a second mode of the plurality of modes corresponds to a second impedance level which is greater than the first impedance level;
wherein a power delivery with the PDN and the VR based on the first mode corresponds to a first control bandwidth frequency, and a first frequency response of a sensitivity of the VR;
wherein a power delivery with the PDN and the VR based on the second mode corresponds to a second control bandwidth frequency, and a second frequency response of the sensitivity; and
wherein, in a range of frequencies above the second control bandwidth frequency, a first local peak of the first frequency response is greater than a second local peak of the second frequency response.

18. The IC of claim 17, wherein:
power delivery with the PDN and the VR based on the first mode further corresponds to a third frequency response of an impedance from the IC to the VR;
power delivery with the PDN and the VR based on the second mode further corresponds to a fourth frequency response of the impedance; and
in the range of frequencies above the second control bandwidth frequency, a third local peak of the third frequency response is greater than a fourth local peak of the fourth frequency response.

19. The IC of claim 17, wherein the VR comprises a compensator unit;
wherein the third circuitry to signal the VR to set the mode comprises the third circuitry to identify a respective setting for each of one or more variable circuit elements of the compensator unit.

20. The IC of claim 17, wherein the third circuitry to signal the VR to set the mode comprises the third circuitry to identify one or more values each corresponding to a respective coefficient of a digital filter.

* * * * *